United States Patent
Schumski et al.

(10) Patent No.: US 9,624,139 B2
(45) Date of Patent: Apr. 18, 2017

(54) WATER-DISPERSIBLE PARTICLES FORMED WITH GRANULES EMBEDDED IN CRYSTALLIZED MATRIX

(71) Applicant: THE ANDERSONS, INC., Maumee, OH (US)

(72) Inventors: Joseph Schumski, Luckey, OH (US); James R Lynch, Toledo, OH (US)

(73) Assignee: THE ANDERSONS, INC., Maumee, OH (US)

(*) Notice: Subject to any disclaimer, the term of this patent is extended or adjusted under 35 U.S.C. 154(b) by 0 days.

(21) Appl. No.: 14/559,682

(22) Filed: Dec. 3, 2014

(65) Prior Publication Data

US 2015/0152017 A1    Jun. 4, 2015

Related U.S. Application Data

(60) Provisional application No. 61/911,432, filed on Dec. 3, 2013.

(51) Int. Cl.
| | | |
|---|---|---|
| *C05C 3/00* | (2006.01) | |
| *C05G 3/00* | (2006.01) | |
| *C05B 7/00* | (2006.01) | |
| *C05C 9/02* | (2006.01) | |

(52) U.S. Cl.
CPC .............. *C05G 3/0047* (2013.01); *C05B 7/00* (2013.01); *C05C 3/00* (2013.01); *C05C 3/005* (2013.01); *C05C 9/02* (2013.01); *C05G 3/0011* (2013.01); *C05G 3/0058* (2013.01)

(58) Field of Classification Search
CPC ...... C05G 3/0047; C05G 3/00; C05G 3/0011; C05G 3/0058; C05G 3/005; C05C 3/00; C05C 3/005; C05C 9/02; C05C 9/005; C05D 7/00; C05D 1/02; C05D 9/02; C05D 9/005; C05F 11/02; C05B 7/00
See application file for complete search history.

(56) References Cited

U.S. PATENT DOCUMENTS

| | | | |
|---|---|---|---|
| 1,966,820 A | 7/1934 | Jones | |
| 3,235,370 A | 2/1966 | Kealy | |
| 3,462,256 A | 8/1969 | Justice et al. | |
| 3,711,254 A | 1/1973 | McGowan et al. | |
| T909,003 I4 | 4/1973 | Hicks et al. | |
| 3,725,029 A | 4/1973 | Blackmore | 71/28 |
| 3,867,124 A | 2/1975 | Church | |
| 3,938,469 A | 2/1976 | Nau | |
| 3,963,118 A | 6/1976 | Ferguson | |
| 4,032,319 A | 6/1977 | Smith et al. | |
| 4,081,264 A | 3/1978 | Ali | |
| 4,244,727 A | 1/1981 | Moore, Jr. | |
| 4,304,588 A | 12/1981 | Moore, Jr. | |
| 4,304,589 A | 12/1981 | Kamo et al. | 71/29 |
| 4,378,238 A | 3/1983 | Goertz | |
| 4,394,149 A | 7/1983 | Szoka et al. | 71/28 |
| 4,579,580 A | 4/1986 | Moore | |
| 4,589,904 A | 5/1986 | Harrison et al. | |
| 4,743,289 A | 5/1988 | Mickus et al. | |
| 4,789,391 A | 12/1988 | Detroit | |
| 4,846,871 A | 7/1989 | Detroit | 71/25 |
| 5,041,153 A | 8/1991 | Detroit | 71/25 |
| 5,075,402 A | 12/1991 | Schmitt et al. | |
| 5,114,458 A | 5/1992 | Castillo et al. | 71/28 |
| 5,238,480 A | 8/1993 | Rehberg et al. | 71/28 |
| 5,286,272 A | 2/1994 | Biamonte et al. | 71/29 |
| 5,328,497 A | 7/1994 | Hazlett | |
| 5,352,265 A | 10/1994 | Weston et al. | |
| 5,354,742 A | 10/1994 | Deming et al. | |
| 5,360,465 A | 11/1994 | Buchholz et al. | 71/11 |
| 5,378,259 A | 1/1995 | Bassetti et al. | |
| 5,433,766 A | 7/1995 | Ming et al. | |
| 5,451,242 A | 9/1995 | Ming et al. | |
| 5,501,720 A | 3/1996 | Buchholz | |
| 5,629,261 A | 5/1997 | Narayanan et al. | |

(Continued)

FOREIGN PATENT DOCUMENTS

| | | |
|---|---|---|
| EP | 0748651 A1 | 12/1996 |
| PL | 123654 B1 | 11/1982 |
| WO | 9827830 A1 | 7/1998 |

OTHER PUBLICATIONS

"Dry Formulations, an Agricultural Perspective", Formulation Forum '99, Orlando, FL, USA, Mar. 3-5, 1999, Luann M. Pugh, "Experimental Design:Extruded Granule Formulation Development", Technical Bulletin 00-6, Uniqema.

Charles F. Mancino, Ph.D. et al. "Fertilizer loss from mowing—Liquid fertilizers and very fine granular fertilizers suffer the least amount of loss from mowing on putting greens." Golf Course Management, Jul. 2001.

Thomas P. Murray, Ph.D. "Urea Formaldehyde and Ammonia Condensation Products." A report prepared for Nu-Gro Technologies, Inc., Feb. 7, 2002.

(Continued)

*Primary Examiner* — Jennifer A Smith
(74) *Attorney, Agent, or Firm* — Avery N. Goldstein; Blue Filament Law PLLC

(57) ABSTRACT

A water-dispersible particle is provided that has a crystalline matrix formed of a potassium salt, a phosphate salt, of a combination thereof. Embedded in the matrix are at least 100 insoluble granules of at least one macronutrient or micronutrient. The granules, and the matrix present in a form such that contact with water causes particle dispersion into more than 100 pieces in a time period of up to 1 hour. A process of forming a fertilizer particle includes the granulation of a quantity of insoluble material to a size where the majority by weight is between 0.02 and 3 millimeters to from granules. The granules are agglomerated into the fertilizer particle containing at least 100 of the granules with a solution of a potassium salt, a phosphate salt, of a combination thereof through solvent removal to form the crystalline matrix in which the granules are embedded.

14 Claims, No Drawings

(56) References Cited

U.S. PATENT DOCUMENTS

| | | | |
|---|---|---|---|
| 5,714,157 A | 2/1998 | Sandell et al. | |
| 5,725,630 A | 3/1998 | Roberts et al. | |
| 5,739,081 A | 4/1998 | Lloyd et al. | |
| 5,747,416 A | 5/1998 | McArdle | |
| 5,976,210 A | 11/1999 | Sensibaugh | |
| 6,013,209 A | 1/2000 | Phinney et al. | |
| 6,030,565 A | 2/2000 | Golan et al. | |
| 6,101,763 A | 8/2000 | Aoki et al. | 47/58.1 R |
| 6,132,484 A | 10/2000 | Phinney et al. | |
| 6,231,660 B1 | 5/2001 | Welshimer et al. | |
| 6,251,826 B1 | 6/2001 | Kulik | |
| 6,287,496 B1 | 9/2001 | Lownds | |
| 6,293,985 B1 | 9/2001 | Phinney et al. | |
| 6,299,663 B1 | 10/2001 | Phinney et al. | |
| 6,387,145 B1 | 5/2002 | Miele et al. | |
| 6,454,979 B1 | 9/2002 | Phinney et al. | |
| 6,461,399 B1 | 10/2002 | Connell | 71/11 |
| 6,464,746 B2 | 10/2002 | Neyman et al. | |
| 6,582,637 B1 | 6/2003 | Phinney et al. | |
| 6,884,756 B2 | 4/2005 | Lynch et al. | 504/101 |
| 7,468,087 B2 | 12/2008 | Sakamoto et al. | 71/28 |
| 7,666,399 B2 | 2/2010 | Birthisel et al. | |
| 7,789,932 B2 | 9/2010 | Anderson et al. | |
| 7,850,758 B2 | 12/2010 | Birthisel et al. | |
| 7,867,507 B2 | 1/2011 | Birthisel et al. | |
| 8,007,559 B2 | 8/2011 | Lynch et al. | 71/11 |
| 8,173,165 B2 | 5/2012 | Lynch et al. | 424/489 |
| 8,419,820 B2 | 4/2013 | Vriesema et al. | |
| 8,435,321 B2 | 5/2013 | Lynch et al. | |
| 2002/0011087 A1 | 1/2002 | Neyman et al. | 71/29 |
| 2005/0241354 A1 | 11/2005 | Wommack et al. | 71/31 |
| 2006/0135368 A1 | 6/2006 | Anderson et al. | |
| 2007/0180877 A1 | 8/2007 | Anderson et al. | |

OTHER PUBLICATIONS

"Product Review—Lesco NOVEX Matrix Technology" (date unknown).
NOVEX brochure from Lesco, Inc., Feb. 2002.
Performance Index Number document (date unknown).
Golfweek's SuperintendentNEWS, p. 1, Feb. 4, 2000.
"Industry Insights: The PIN Rating System, the future for fertilizers, the future for golf." Superintendent News Special Advertising Feature (date unknown).

WATER-DISPERSIBLE PARTICLES FORMED WITH GRANULES EMBEDDED IN CRYSTALLIZED MATRIX

RELATED APPLICATIONS

This application claims priority benefit of U.S. Provisional Application Ser. No. 61/911,432 filed Dec. 3, 2013; the contents of which are hereby incorporated by reference.

FIELD OF THE INVENTION

The present invention relates in general to a binder solution containing urea and in particular to the use of such a binder to form a bioavailable nitrogen containing water-dispersible particles.

DESCRIPTION OF THE RELATED ART

Fertilizer is any organic or inorganic material of natural or synthetic origin that is added to a soil to supply one or more plant nutrients essential to the growth of cultivated vegetation. Fertilizers typically provide, in varying proportions: six macronutrients: nitrogen (N), phosphorus (P), potassium (K), calcium (Ca), magnesium (Mg), and sulfur (S); and eight micronutrients: boron (B), chlorine (Cl), copper (Cu), iron (Fe), manganese (Mn), molybdenum (Mo), zinc (Zn) and nickel (Ni). Only three other macronutrients are required by all plants: carbon, hydrogen, and oxygen, which are supplied by water (through rainfall or irrigation) and carbon dioxide in the atmosphere. Compound fertilizers often combine N, P and K fertilizers into easily dissolved pellets. The N:P:K ratios quoted on fertilizers give the weight percent of the fertilizer in nitrogen (N), phosphate ($P_2O_5$) and potash ($K_2O$ equivalent).

Fertilizer application to large areas of cultivated vegetation such as golf courses, parks, lawns, gardens and woodlands has generally been broadcast application of granular products containing an agent, for example via rotary spreader. Agents include plant nutrients, fertilizer, and pesticides. Using granular products having particle sizes in the range of about 0.5 millimeter to about 15 millimeters, an operator can cover a large area with minimal distance traversed by the spreader itself, while applying the granular products relatively uniformly to the desired area.

The instant applicant has developed granules that make up a fertilizer particle are generally held together with water soluble binders. The fertilizer pellets, when handled without coming into contact with water, have physical characteristics of controlled release nitrogen granules, allowing broadcast application. Following application, the pellets disperse as the binder breaks down on contact with moisture from the treated area itself, from irrigation or from natural precipitation. The dispersion of the pellets allows the controlled release nitrogen and other active ingredients to be deposited downwards and laterally from the original position of the particle, so that the controlled release nitrogen and other active ingredients are less likely to be removed from the treated area, ingested by small children or animals, or otherwise contacted by people, animals, clothing, footwear or equipment. Water-dispersibility also prevents wastage of any relatively expensive components of the pellets since more of the ingredients reach their respective targets. U.S. Pat. No. 8,435,321 is representative of these efforts.

Typical binders for fertilizers have included lignosulfonates, natural gums, carbohydrates and proteinaceous solutions. The increased demand for some binder materials has led to supply disruptions and price swings. For example, demand for guar gum primarily from the oil industry for use in drilling and by the natural gas industry for use in the hydraulic fracturing process for sourcing natural gas has caused more than ten-fold increase in the cost of guar gum from 2010 to 2012. Binders in such pellets generally add considerable cost while adding little, if any to the N-P-K value of the fertilizer available to promote plant growth.

While considerable attempts have been made to use crystallized urea and sulfur binders for fertilizer particles, these attempts have met with limited success owing to the low crush strength of the resulting particles. The handling of such particles is difficult and as a result of breakage are prone to dusting.

Thus, there is a continuing need for binder substitutes that are economical and readily available. There also exists a need for a dispersible fertilizer particle including such a binder.

SUMMARY OF THE INVENTION

A water-dispersible particle is provided that has a crystalline matrix formed of a potassium salt, a phosphate salt, of a combination thereof. Embedded in the matrix are at least 100 insoluble granules of at least one macronutrient or micronutrient. The granules, and the matrix present in a form such that contact with water causes particle dispersion into more than 100 pieces in a time period of up to 1 hour.

A process of forming a fertilizer particle includes the granulation of a quantity of insoluble material to a size where the majority by weight of the granules are from 0.02 millimeter to 3 millimeters to form granules. The granules are agglomerated into the fertilizer particle containing at least 100 of the granules with a solution of a potassium salt, a phosphate salt, a soluble bioavailable nitrogen substance, of a combination thereof through solvent removal to form the crystalline matrix in which the granules are embedded.

DETAILED DESCRIPTION OF THE INVENTION

The present invention relates to a novel binder and the use thereof to form a water-dispersible particle for delivery of bioavailable nitrogen to a plant, the binder being a crystalline matrix formed by the dissolution and drying of a potassium salt, phosphate salt, soluble bioavailable nitrogen substance, or a combination thereof.

The invention further relates to a method for making and using the water-dispersible particle. The inventive particle retains its size and shape during handling and application to a desired area with the crystalline particle matrix dissolving upon contact with a water overspray within twelve hours to release low solubility pieces from within the particle. Thus, the durability of the particle allows delivery of the particle to the vicinity of the desired site of action whereupon contact with water sufficient to wet the particle surface causes dispersion of particle components, facilitating distribution of the active agents to the target. Through limited or no usage of traditional binder substances, a number of desirable attributes are imparted to the resulting particles. These attributes include reduced production cost, reduced weight for a given fertilizer loading, and a lighter coloration.

As used herein, the term dispersion is intended to mean that an inventive particle disperses by breaking into numerous smaller pieces upon contact with water. In specific inventive embodiments, an inventive particle disperses by breaking up into greater than 100 smaller pieces upon contact with water over a period of time ranging from 1 second to 24 hours. In other inventive embodiments, an inventive particle disperses into 1,000 to 10,000 smaller pieces over a period of time ranging from 1 second to 12 hours. In still other inventive embodiments, a particle disperses into 100 to 10,000 smaller pieces over a period of 30 seconds to 6 hours. In still other inventive embodiments, a particle disperses as described over a period of 1 minute to 1 hour. The ability of the inventive material to degrade with water is generally measured in a water dispersibility test. The test involves placing about 10 grams of the inventive material into 100 ml of water at room temperature in a closed glass container. The container is then inverted and the time is observed until the material disperses. After every minute, the container is inverted. The inventive material of the present invention has a dispersibility time of generally less than 15 minutes with a period of less than 5 minutes being preferred and a period of less than 2 minutes being most preferred. The inventive particle provides a delivery system for controlled release nitrogen, and optional additional agents such as plant nutrients, pesticides, hormones, herbicides, micronutrients and other active ingredients.

As used herein, the term methylene urea is intended to encompass a methylene urea oligomer or a mix of methylene urea oligomers as represented by the formula $NH_2CONH(CH_2NHCONH_2)_nH$, where n is an integer from 1-10. Illustrative examples of methylene urea oligomers include methylene diurea ($NH_2CONHCH_2NHCONH_2$), dimethylene triurea ($NH_2CONHCH_2$ $NHCONHCH_2NHCONH_2$), trimethylene tetraurea and tetramethylene pentaurea. Methylene urea is a slow release substance that forms pieces upon particle contact with water to dissolve or disrupt the particle crystalline matrix.

As used herein, insoluble indicates a granular substance present in an inventive particle that dissolves in water at 20° C. to an amount of less than 10 weight percent within 24 hours in 100 parts by weight water per part of the granular substance. The term "slow release" is used synonymously herein with "insoluble". Conversely, a soluble substance such as a soluble bioavailable nitrogen substance as detailed herein dissolves in water at 20° C. to an amount of greater than 10 weight percent within 24 hours in 100 parts by weight water per part of the granular substance.

It is to be understood that in instances where a range of values are provided herein, that the range is intended to encompass not only the end point values of the range, but also intermediate values of the range as explicitly being included within the range and varying by the last significant figure of the range. By way of example, a recited range of from 1 to 4 is intended to include 1-2, 1-3, 2-4, 3-4, and 1-4.

A crystalline matrix of an inventive particle embeds the insoluble granule component. Such a matrix is formed by the drying of a solution of potassium salt, a phosphate salt, of a combination thereof in contact with at least 100 insoluble granules. The matrix is present from 1 to 90% by weight of an inventive particle. In other embodiments, the matrix is present from 5 to 70% by weight of an inventive particle.

While potassium salts and phosphate salts of the present invention are readily soluble in water at 20° C., in some embodiments heated water is used to increase the rate of dissolution, the concentration It is appreciated that in addition to water solutions of potassium salts, phosphate salts, or combinations thereof; solutions are readily formed that are a majority by weight water with the remainder being a $C_1$-$C_6$ alcohol, such as methanol, isopropanol, butanol, or pentanol; $C_1$-$C_4$ ketone such as acetone; a $C_2$-$C_6$ glycol; formamide; or a combination thereof. It is appreciated that such solvent blends afford control over evaporation rates and thereby allow adjustment of agglomeration conditions at a given temperature and equipment settings. It is further appreciated that inventive particles are typically reduced to a water content of between 0.1 and 10 weight percent and solution solvent content beyond this level must be volatilized thereby favoring solutions of high concentration for a given solute that are still able to wet the surfaces of the insoluble granules. Accordingly, water or other aqueous solvent blend is typically add in an amount of 3 to 50 relative to the soluble potassium salt, phosphate salt or combination thereof present.

A crystalline matrix according to the present invention is formed from a potassium salt, phosphate salt, a soluble bioavailable nitrogen substance, or a combination thereof and contributes to a N-P-K value of a composition of inventive particles. A crystalline matrix is readily formed by the dissolution in whole or part of one or more potassium salts of potassium sulfate (sulfate of potash), potassium nitrate (nitrate of potash), potassium metaphosphate, potassium chloride (muriate of potash), dipotassium carbonate, or potassium oxide, or a combination of any of the aforementioned, or with a soluble phosphate salt or soluble bioavailable nitrogen substance. A crystalline matrix is readily formed by the dissolution in whole or part of one or more phosphate salts of monoammonium phosphate, diammonium phosphate, super phosphate, double super phosphate, triple super phosphate, potassium metaphosphate, or phosphate rock, alone or in combination of any of the aforementioned, or with an aforementioned potassium salt or soluble bioavailable nitrogen substance. A crystalline matrix is readily formed by the dissolution in whole or part of one or more soluble bioavailable nitrogen substance of one or more of urea; thiourea; polyvinyl ureas; ammonium salts, such as metal ammonium phosphates, ammonium nitrate, ammonium sulfate, urea, coated urea, monoammonium phosphate, and diammonium phosphate; dicyandiamide, carbodiimides, crotilidiene diurea, nitrocellulose, calcium nitrate, or a combination thereof.

Granulized materials beneficial for plant growth include macronutrients, micronutrients, soil amendments, nutrients to benefit the soil biome, organisms to improve the soil quality, and combinations thereof. An inventive particle promotes the growth of targeted desirable organisms illustratively including cultivated plants such as lawn grass, crops, flowers, shrubs, trees and bushes.

The bioavailable nitrogen containing ingredient is present in amounts ranging from 0% to 90% by weight of the total dry weight of the particle. In some inventive embodiments, the majority of the bioavailable nitrogen present is in an insoluble granular form. In other inventive embodiments, the bioavailable nitrogen is present in amounts ranging from 15% to 80% by weight of the total dry weight of the particle. In still other inventive embodiments, the bioavailable nitrogen containing ingredient is present in amounts ranging from 20% to 70% by weight of the total dry weight of the particle. It is appreciated that some matrix forming salts contain ammonium ions impart bioavailable nitrogen in a soluble form.

Bioavailable nitrogen is nitrogen in a form that fills a nutritional requirement of a plant either directly, where the plant is capable of physiological processing of a nitrogen containing ingredient, or indirectly, where another organism such as a bacterium must first act on the nitrogen containing ingredient to produce a nitrogen form usable by the plant. Illustrative examples of a bioavailable nitrogen containing insoluble ingredient operative herein illustratively includes methylene urea, oxamide, urea formaldehyde-based compounds, and isobutylene diurea. In some inventive embodiments insoluble granules of bioavailable nitrogen constitute the only granules present in a crystalline matrix and as such are present with at least 100 granules per particle. Struvite in some embodiments represents one of, or the only granules present in an inventive particle. In other embodiments, between 100 and 1000 granules of bioavailable nitrogen are present per particle. In still other embodiments, between 1000 and 10,000 granules of bioavailable nitrogen are present per particle. It has been determined that upon consideration of the total volume of a spherical particle, the inclusion of a granule number of at least 100 defines a balance between granules small enough to intercalate into a soil to which inventive particle are applied and a granule surface area that is completely wetted and therefor embedded in a matrix of potassium salts, phosphate salts, or a combination thereof that is in the range of meaningful N-P-K values of most fertilizers.

While it is appreciated that granule size is readily varied in concert with the size of the particle to assure at least 100 granules per particle, typically grind sizes of granules range from 0.02 microns to 3 microns.

In other inventive embodiments, the insoluble granules include an additive of soil nutrients, amendment materials, biological factors and biostimulants. To the extent that an additive contributes bioavailable nitrogen, such contribution considered minimal and not counted toward the amount of bioavailable nitrogen provided above of 0 to 90%. A solid or powder of such additives are recognized to be operative herein. It will be recognized by those skilled in the art that more than one additive may be incorporated into the particle and that the choice of active ingredient or combination of active ingredients will depend on the intended purpose of the particle and the chemical compatibility of the ingredients and other particle components.

In specific inventive embodiments, the soil amendment material constitutes between 0 and 100% of the number of insoluble granules present in the inventive particle. In still other inventive embodiments, soil amendment material constitutes between 1 and 30% of the number of insoluble granules present in the inventive particle.

Where the additive is a biological factor or biostimulant constitutes between 0 and 100% of the number of insoluble granules present in the inventive particle. In still other inventive embodiments, biological factor or biostimulant constitutes between 0.01 and 10% of the number of insoluble granules present in the inventive particle. In a still more preferred embodiment, the biological factor or biostimulant constitutes between 0.1 and 1% of the number of insoluble granules present in the inventive particle.

Soil micronutrients illustratively include calcium, magnesium, sulfur, iron, manganese, copper, zinc; oxides thereof, salts thereof and combinations thereof. Biological factors are those factors that have a deleterious effect on a biological organism and illustratively include algicides, bacteriocides, defoliants, desiccants, fungicides, herbicides, insecticides, insect growth regulators, miticides, nematicides, ovicides, pesticides, pheromones, repellents, rodenticides and a combination thereof. Biostimulants are substances that promote plant survival and health and illustratively include plant growth hormones and plant growth regulators such as cytokinins, auxins, gibberellins, ethylene, absisic acid and a combination of these.

The particles of the present invention have a mean particle domain size that ranges from 0.2 millimeter to 30 millimeters. In still other embodiments, the mean particle domain size ranges from 0.25 millimeter to 20 millimeters. In still other embodiments, the mean particle domain size ranges from 0.50 millimeter to 15 millimeters. The particles formed by the process of the present invention have a Uniformity Index rating in the range of 10 to 70 where the Uniformity Index rating is calculated as the $10^{th}$ percentile particle size expressed as a percentage of the $95^{th}$ percentile particle size.

It is appreciated that a conventional binders is also used in an inventive particle either as an overcoating or mixed through the particle. Conventional binders including carbohydrates such as monosaccharides, disaccharides, oligosaccharides and polysaccharides; proteins; lipids; glycolipid; glycoprotein; lipoprotein; and combinations and derivatives of these. Specific carbohydrate binders illustratively include dextrose, glucose, mannose, fructose, galactose, sucrose, lactose, maltose, xylose, arabinose, trehalose and mixtures thereof such as corn syrup; celluloses such as carboxymethylcellulose, ethylcellulose, hydroxyethylcellulose, hydroxymethylethylcellulose, hydroxyethylpropylcellulose, methylhydroxyethyl-cellulose, methylcellulose; starches such as amylose, seagel, starch acetates, starch hydroxyethyl ethers, ionic starches, long-chain alkyl starches, dextrins, amine starches, phosphates starches, and dialdehyde starches; plant starches such as corn starch and potato starch; other carbohydrates such as pectin, amylopectin, xylan, glycogen, agar, alginic acid, phycocolloids, chitin, gum arabic, guar gum, gum karaya, gum tragacanth and locust bean gum; complex organic substances such as lignin and nitrolignin; derivatives of lignin such as lignosulfonate salts illustratively including calcium lignosulfonate and sodium lignosulfonate and complex carbohydrate-based compositions containing organic and inorganic ingredients such as molasses. Suitable protein binders illustratively include soy extract, zein, protamine, collagen, and casein. Binders operative herein also include synthetic organic polymers capable of promoting or producing cohesion of methylene urea oligomer fines and these illustratively include ethylene oxide polymers, polyacrylamides, polyacrylates, polyvinyl pyrrolidone, polyethylene glycol, polyvinyl alcohol, polyvinylmethyl ether, polyvinyl acrylates, polylactic acid, and latex. In an embodiment, the additional binder is calcium lignosulfonate, molasses, a liquid corn starch, a liquid corn syrup or a combination thereof.

The inventive particles in other embodiments has N-P-K values of between 0-48:0-52:0-62 where at least one of N or P or K is non-zero.

In some embodiments, an inventive particle has an overcoating of a binder, as detailed above or other substances. Overcoating substances illustratively include biostimulants, especially those that are intolerant of heating, adhesives, oils, waxes, silicates, or colloidal silica, and combinations thereof to modify particles properties such as the kinetics of matrix dissolution, particle hardness, or dust control.

In still other embodiments, an aforementioned additive is retained on the surface of the particle through contact with the overcoating. In another embodiment, the additive is mixed with an adhesive before application to a particle. An adhesive is a substance that binds to a particle, such that the active ingredient adheres to the particle in suspension in the adhesive. The adhesive may be the same as the binder or different. The choice of adhesive depends on the particle components and will be evident to one skilled in the art. Examples of adhesives include, but are not limited to, substances listed herein as binder components.

For example, the active ingredient in powdered form is adhered to the outside surface of the particle with the use of an adhesive. An adhesive liquid may be used and is applied before or after the addition of the powdered active ingredient or it may be applied at the same time as the active ingredient. The choice of adhesive depends on the particle components and will be evident to one skilled in the art. Examples of a liquid adhesive include but are not limited to binders listed herein, including mineral oils or polymer liquids such as polybutene.

A process for making inventive particles includes the granulation of a quantity of insoluble material to a size where the majority by weight of 0.02 to 3 millimeters to form granules. In some embodiments, the granules are size sieved prior to continuing with the formulation of inventive granules. Grinding is readily performed by conventional techniques illustratively including hammer milling, ball milling, and air milling. It is appreciated that in some inventive processes, the potassium salt, phosphate salt, or combination thereof from which the matrix will be formed are also readily milled by like techniques. The salts in other inventive embodiments are intermixed with the insoluble granules prior to in situ wetting to form salt solutions that upon drying form the matrix in which the insoluble granules are embedded. In other inventive embodiments, the matrix forming salt or salts are dissolved to form the solution prior to contact with the insoluble granules. In still other embodiments, a combination of solution and milled salts intermixed with the insoluble granules are used in combination.

The agglomeration of the insoluble granules into an inventive fertilizer particle containing at least 100 of the granules occurs using a agglomeration machine such as a pan agglomerator, pin mixer, drum granulator, or roll compactor. During agglomeration solvent is removed under conditions to include nucleation of particles and the crystallization of the matrix salts in which insoluble granules are embedded.

As an alternative to agglomeration in particles, a slurry of salt solution and insoluble granules are dried to a paste slurry that is amenable to extrusion or molding. While particles of the present invention formed by agglomeration are spherical in shape extrusion or molding are wellsuited for forming take any shape illustratively including cylinders, ellipses, rods, cones, discs, and needles. Molding is appreciated to be well-suited for the formation of tree or plant spike adapted to plunging or hammering into soil proximal to a target plant.

Subsequent to agglomeration, in some embodiments additional drying reduces the water content of the particles to below 10 total weight percent. Various techniques exist for drying the material are available. Exemplary of these techniques is a fluid bed drying. The material is placed in a fluid bed drier and the drier inlet air temperature ranges from about 120° F. to about 220° F. While in other embodiments, the temperature ranges from 140° F. to 190° F. Further methods of drying particles will be apparent to one of skill in the art and illustratively include use of a rotary drum dryer and drying under vacuum conditions.

The particles of the present invention have a minimum Resistance To Attrition (RTA) rating ranging from 60% to 100% as determined by the method detailed in the terminal example or an art-recognized equivalent procedure.

The particles of the present invention are administered to a target plant species to produce a desired effect directly on the plant, to promote the health of the soil biome in which the plant is growing, or to inhibit an undesirable organism in proximity to the target plant. Particles are administered by a method that delivers the particles to the vicinity of the plant. For example, where a particle contains a controlled release nitrogen source such as methylene urea oligomers and an active ingredient such as a plant hormone, the particles are delivered to a desirable plant target, such as a golf course lawn, by broadcast scattering via rotary spreader. The particles are then dispersed by water that is user-applied or natural such as rain, dew or atmospheric humidity to affect dispersion of the granules contained within the particle into the soil. The water induced dispersion of a particle into more than 100 hundred pieces upon wetting inhibits particle movement by wind, machinery such as mowers and tractors, and animals. Additionally, the pieces so formed through dispersion percolate into soil pores. Alternatively, the particles are placed in a limited target area such as near a particular desired plant in a garden or in a crop row. In another embodiment, the particles are placed under the soil surface. In the case of macronutrients and micronutrients, the presence of the pieces within the soil has the surprising benefit of promoting deeper root growth as compared to conventional surface release of macronutrients and micronutrients, thereby making the target plant more robust and less prone to drought damage.

The present invention is further detailed with respect to the following nonlimiting examples. These examples are intended to be illustrative of specific embodiments and should not be construed as limiting the pending claims to the scope of these examples.

Example 1

Using a pan agglomeration disk, 28 kilograms of ammonium sulfate, 38 kilograms of sulfate of potash, and 34 kilograms of methylene urea all ground to a granule sizes of less than 250 microns are wet with 10 kilograms of water and mixed thoroughly. The agglomeration disk is operated and adjusted to generate the desired size distribution of particles with a retention time of 5 seconds to 2 minutes before the particles are conveyed to a fluid bed drier where the material is dried at a temperature of 140° F. to a moisture content of less than 0.5% to form a 17-0-17 N-P-K fertilizer. The material is then separated into various size categories using conventional gyroscopic screeners. General size of these product streams are as follows, 3,360 microns and larger, from 3,360 microns to 1,191 microns, from 1,191 microns to 594 microns, and material smaller than 594 microns. The range of sizing for each product stream can be varied to separate the desired material from the mixture of sizing. The resulting particles disperse into more than 100 granules, or pieces of granules upon placing 1 gram of such particles in 100 grams of water for 30 minutes.

Example 2

The process of Example 1 is repeated with the addition of 2 kilograms of iron sulfate and 1 kilogram of manganese sulfate dissolved in the water and a 3 kilogram reduction in methylene urea content with like properties.

Example 3

The process of Example 1 is repeated with the addition of 42 kilograms of humic to a pan agglomeration disk to form a homogeneous mixture to yield a particle with like properties to that of Example 1.

Example 4

Using a pan agglomeration disk, 22 kilograms of monoammonium phosphate and 44 kilograms of potassium chloride are dissolved in 80 kilograms of water. The solution is mixed with 33 kilograms of methylene urea ground to a granule sizes of less than 250 microns. The agglomeration disk is operated and adjusted to generate the desired size distribution of particles for 30 seconds before the particles are conveyed to a fluid bed drier where the material is dried at a temperature of 140° F. to a moisture content of less than 0.5% to form a 18-9-18 N-P-K fertilizer. The material is then separated into various size categories using conventional gyroscopic screeners. General size of these product streams are as follows, 3,360 microns and larger, from 3,360 microns to 1,191 microns, from 1,191 microns to 594 microns, and material smaller than 594 microns. The range of sizing for each product stream can be varied to separate the desired material from the mixture of sizing. The resulting particles disperse into more than 100 granules, or pieces of granules upon placing 1 gram of such particles in 100 grams of water for 30 minutes.

Example 5

The process of Example 4 is repeated with the addition of 1 kilogram of iron sulfate and 0.5 kilograms of manganese sulfate dissolved in the water to yield a particle with like properties to that of Example 4.

Example 6

The process of Example 4 is repeated with isobutylene diurea in place of methylene urea to form like particles.

Example 7

The process of Example 4 is repeated with milled salts intermixed with the methylene urea granules and the water added in situ to the mixture to form a solution to form like particles.

Example 8

The solution and methylene urea of Example 4 are placed in a drum evaporator and dried until a paste slurry is formed. The slurry is feed into a screw extruder terminating in a die equipped with a rotary cutter to form rods of like composition to the particles of Example 4.

Example 9

Apparatus: Ro-Tap sieve shaker with 8-inch sieves, balance with 0.1 g sensitivity, 10-min timer, and 10 steel balls with smooth surfaces and 16 mm (⅝ in.) in diameter.

1. Using information from the Screen Analysis, choose your limiting screen size. The following table indicates the limiting screen for several fertilizer blends.

| Fertilizer Sizing | U.S. (Tyler) |
|---|---|
| Coarse | 16 (14) |
| Premium Standard | 20 (20) |
| Fairways | 20 (20) |
| Greens | 30 (28) |

2. Place about 75 g of a representative sample onto the limiting screen.
3. Reassemble the screen apparatus with the limiting screen just above the pan.
4. Place the screen apparatus onto the shaker and run it for 10 min (Use the hammer).
5. Empty the pan. Transfer 50.0 g of sample to the pan.
6. Put ten (10) 16-mm steel balls in the pan with the sample.
7. Reassemble the screen apparatus and place it onto the shaker and run it for 10 min (Do not use the hammer).
8. Remove the steel balls from the pan and transfer the sample back into the limiting screen.
9. Place the screen apparatus back onto the shaker and run it for 10 min (Use the hammer).
10. Weigh out the amount that remained on the limiting screen to the nearest 0.1 g and compare it to the original amount.

Percent resistance to attrition=$\{(100 \cdot a)/b\}$, where a is the weight of the fraction that remained on the limiting screen in Step 10 and b is total weight of the sample in Step 5.

Any patents or publications mentioned in this specification are indicative of the level of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present methods, procedures, treatments, molecules, and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

The invention claimed is:
1. A water-dispersible particle consisting of:
a crystalline matrix formed of a potassium salt, a phosphate salt, a soluble bioavailable nitrogen substance or a combination thereof, said crystalline matrix devoid of traditional binder of a carbohydrate, a protein; a lipid, a glycolipid, a glycoprotein, or a lipoprotein;
at least 100 pieces of at least of one macronutrient or micronutrient as insoluble granules;
the granules, and the matrix present in a form such that contact with water causes particle dispersion into the at least 100 pieces in a time period of up to 1 hour; and
optionally including a natural organic product selected from the group consisting of: humic acid, blood meal, bone meal, seed meal, feather meal, soy meal, meat meal, animal waste, activated sludge, hydrolyzed animal hair, a fish byproduct, compost, and combinations thereof.
2. The particle of claim 1 wherein the time period is 1 second to 1 hour.
3. The particle of claim 1 wherein the time period is less than 15 minutes.
4. The particle of claim 1 wherein the potassium salt is present and selected from the group consisting of: sulfate of potash, muriate of potash, nitrate of potash, potassium metaphosphate, dipotassium carbonate, potassium oxide and combinations thereof.
5. The particle of claim 1 wherein the phosphate salt is present and selected from the group consisting of: monoammonium phosphate, diammonium phosphate, super phosphate, double super phosphate, triple super phosphate, potassium metaphosphate, phosphate rock and combinations thereof.

6. The particle of claim 1 wherein the potassium salt and the phosphate salt are both present.

7. The particle of claim 1 wherein the crystalline matrix is present between 1 and 90 weight percent.

8. The particle of claim 1 wherein the particle has a density of between 880 and 1040 kilograms per cubic meter.

9. The particle of claim 1 further comprising an overcoating.

10. The particle of claim 1 wherein the macronutrient is present and includes at least one of methylene urea, struvite, or isobutylene diurea.

11. The particle of claim 10 wherein the micronutrient is present and includes at least one of magnesium, iron, manganese, and zinc; or oxides of any of the aforementioned; or salts of any of the aforementioned.

12. The particle of claim 1 wherein water causes particle dispersion into between 1,000 and 10,000 pieces.

13. The particle of claim 1 wherein the mean particle domain size ranges from 0.2 millimeter to 30 millimeters.

14. A fertilizer comprising:
a plurality of particles of claim 1.

* * * * *